US008160010B2

(12) United States Patent
Bonald et al.

(10) Patent No.: US 8,160,010 B2
(45) Date of Patent: Apr. 17, 2012

(54) SCHEDULING METHOD FOR A GIVEN TRANSMISSION TIME SLOT

(75) Inventors: Thomas Bonald, Voisins le Bretonneux (FR); Nidhi Hegde, Paris (FR); Alexandre Proutiere, Paris (FR)

(73) Assignee: France Telecom, Paris (FR)

( * ) Notice: Subject to any disclaimer, the term of this patent is extended or adjusted under 35 U.S.C. 154(b) by 521 days.

(21) Appl. No.: 12/305,771

(22) PCT Filed: Jun. 22, 2007

(86) PCT No.: PCT/FR2007/051500
§ 371 (c)(1),
(2), (4) Date: Feb. 24, 2009

(87) PCT Pub. No.: WO2008/000998
PCT Pub. Date: Jan. 3, 2008

(65) Prior Publication Data
US 2010/0238907 A1     Sep. 23, 2010

(30) Foreign Application Priority Data
Jun. 30, 2006  (FR) ..................................... 06 52731

(51) Int. Cl.
*H04W 4/00*     (2009.01)
(52) U.S. Cl. ........................................ 370/329; 370/326
(58) Field of Classification Search ........... 370/326–345
See application file for complete search history.

(56) References Cited

U.S. PATENT DOCUMENTS

| 7,542,722 B2* | 6/2009 | Carlsson ...................... 455/63.1 |
| 7,719,973 B2* | 5/2010 | Abedi ........................... 370/230 |
| 7,751,423 B2* | 7/2010 | Hottinen et al. .............. 370/437 |
| 2003/0128658 A1* | 7/2003 | Walton et al. ................. 370/208 |
| 2003/0147370 A1 | 8/2003 | Wu |
| 2006/0039312 A1* | 2/2006 | Walton et al. ................. 370/319 |

OTHER PUBLICATIONS

ETSI Standards, "Universal Mobile Telecommunications System (UMTS)," European Telecommunications Standards Institute, Sophia—Antipo, France, vol. 3-R2 (V700), pp. 1-30 (Mar. 2006).
Landstrom et al., "An NS Module for Simulation of HSDPA," Technical Report, Apr. 2006, pp. 1-21, extracted from website: http://pure.itu.se/ws/fbspretrieve/161024 Feb. 8, 2007.

* cited by examiner

*Primary Examiner* — Andrew Lai
*Assistant Examiner* — Juvena Loo
(74) *Attorney, Agent, or Firm* — Drinker Biddle & Reath LLP

(57) ABSTRACT

A scheduling method for a time division multiplex time slot including: establishing a first list of terminals to transmit and connected to one or more stations; while the first list contains one or more terminals: selecting a terminal from the first list; adding the selected terminal to a second list; determining two or more stations to which the selected terminal is connected, and if the first list contains one or more other terminals also connected to the determined stations, deleting the other terminal(s) from the first list; when the first list is empty, commanding transmission during the time slot to terminals of the second list; and if a terminal from the second list is connected to at least two stations, commanding transmission from the two stations.

8 Claims, 2 Drawing Sheets

_US 8,160,010 B2_

SCHEDULING METHOD FOR A GIVEN TRANSMISSION TIME SLOT

CROSS-REFERENCE TO RELATED APPLICATIONS

This application is the U.S. national phase of the International Patent Application No. PCT/FR2007/051500 filed Jun. 22, 2007, which claims the benefit of French Application No. 06 52731 filed Jun. 30, 2006, the entire content of which is incorporated herein by reference.

FIELD OF THE INVENTION

The invention relates to a scheduling technique for a given transmission time slot, time being divided into time slots for time-division multiplex transmission to a plurality of terminals.

BACKGROUND OF THE INVENTION

One of the key functions of planned changes to version R5 of the UMTS (Universal Mobile Telecommunications Systems) standard is the introduction of an HSDPA (High Speed Downlink Packet Access) time-shared access radio channel for high-speed downlink transmission of data packets. The paper "High Speed Downlink Packet Access (HSDPA)—Enhanced Data Rates for UMTS Evolution" by I. Forkela, H. Klennera, and A. Kempera published in Computer Networks, Volume 49, Issue 3, 19 Oct. 2005, pages 325-340, provides a general description of integrating HSDPA into the UMTS standard. This type of access increases cell capacity and offers higher data rates than UMTS version R99 on the downlink radio connection between a base station (Node B) and mobile terminals. An HS-DSCH (High-Speed Downlink Shared CHannel) downlink shared access radio channel is time-shared between mobile terminals in a given cell by a scheduling device that selects a receiver mobile terminal for a given time slot. The data packets transmitted to the mobile terminals are time-division multiplexed by a transmitting station, each terminal receiving in turn data packets transmitted during time slots with a duration of the order of one millisecond assigned to respective terminals. For opportunistic scheduling, for example, the scheduling device elects to transmit during a given transmission time slot to a mobile terminal for which radio conditions are favorable. To this end, the scheduling device uses radio measurements of a reference radio signal for the cell carried out by the mobile terminals and sent back to the Node B. This technique can handle rapid changes in the quality of the radio link between the Node B and a mobile terminal. It also adapts the modulation and coding formats used for transmission as a function of radio link quality and uses a specific retransmission protocol known as the Hybrid Automatic ReQuest (HARQ) protocol.

Also, a mobile terminal may find itself in an area of overlap between first and second cells and connected either to the transmitting station of the first cell or the transmitting station of the second cell. These transmitting stations can belong to two different Nodes B or to the same Node B having two radio antennas covering two separate angular sectors. According to version R99 of the UMTS standard, the mobile terminal can maintain a plurality of simultaneous radio links with a plurality of respective transmitting stations in order to facilitate passage from one cell to the other. This technique, known as "soft handover", further increases the power of the signal received by the terminal in areas of high interference, such as areas of overlap between two cells, as the various transmitting stations engaged in the soft handover process transmit the same data to the mobile terminal simultaneously.

It is not possible to transpose the soft handover technique to HSDPA since scheduling is managed independently at each transmitting station and as a function of scheduling criteria specific to that station.

There is therefore a need for a technique for increasing the power of the signal received by a mobile terminal in areas of overlap between two or more cells that retains the advantages of using a downlink radio connection with time-shared access in a cell.

SUMMARY OF THE INVENTION

The invention addresses this need by proposing a method of scheduling for a given transmission time slot, time being divided into time slots for time division multiplex transmission to a plurality of terminals. The method comprises:

a. a step of establishing a first list of active terminals having one or more data packets waiting to be sent, said terminals being connected to one or more of the transmitting stations of a group of transmitting stations;

b. a test step of verifying if the first list contains one or more terminals;

c. if the test is positive, a step of selecting a terminal from the first list;

d. a step of adding the selected terminal to a second list;

e. a step of determining the transmitting station or stations to which the selected terminal is connected;

f. if the first list contains one or more other terminals also connected to the transmitting station or to one or more of the transmitting stations determined in the step e, a step of deleting said other terminal(s) from the first list;

the steps b to f being repeated until the first list is empty, and, when the first list is empty, there follows a step of commanding transmission during the given time slot, to the terminal or terminals from the second list, of the respective data packet or packets waiting to be sent, and, if a terminal from the second list is connected to at least two transmitting stations, the step of commanding transmission commands transmission of the data packet waiting to be sent for this terminal from the two transmitting stations.

According to the invention, a first list of terminals having one or more packets waiting to be sent in one or more of the transmitting stations of a predetermined group is first established. A terminal in an overlap area can be connected to a number of transmitting stations. If a terminal in an overlap area is selected during the selection step, it is inserted into a second list and during the transmission time slot all the transmitting stations to which it is connected transmit simultaneously. Simultaneous transmission increases the power received by the terminal and significantly reduces the level of intercellular interference between the transmitting stations of the group. No other transmission by these transmitting stations, to which the selected terminal is connected, is possible; the terminals having one or more packets waiting to be sent in these stations are therefore removed from the first list. Effecting global selection at the level of all the transmitting stations of a predetermined group therefore significantly increases the capacities of the transmitting stations of the group.

The step of selecting a terminal from the first list is advantageously effected as a function of radio link quality measurements effected by the terminals in the first list on a reference radio signal from one or more transmitting stations to which they are connected.

In each transmission time slot, a terminal generally sends back measurements that it has effected on a reference signal from one or more of the transmitting stations to which it is connected. Selection as a function of these measurements means that the terminal with the best reception quality is chosen for each transmission time slot. The process can therefore cope with radio conditions that are changing very quickly during the transmission time slots.

The step of selecting a terminal from the first list is preferably effected using an opportunistic scheduling algorithm.

An opportunistic scheduling algorithm also guarantees the terminals fair access to the shared radio channel, maximizing the transmitted data rate.

The invention also provides a scheduling device for a transmission time slot, time being divided into time slots for time-division multiplex transmission to a plurality of terminals. The device comprises:

means for establishing a first list of active terminals, adapted to establish a list of terminals having one or more data packets waiting to be sent and connected to one or more of the transmitting stations of the group of transmitting stations;
test means for verifying if the first list contains one or more terminals;
means for selecting a terminal from the first list;
means for adding the selected terminal to a second list, adapted to add the selected terminal to a second list;
means for determining connection transmitting stations, adapted to determine the transmitting station(s) to which the selected terminal is connected;
means for removing from the first list terminals connected to the transmitting station or one or more of the transmitting stations determined by the determination means;
means for commanding transmission during the given time slot, adapted to command transmission to the terminal(s) in the second list the respective data packet(s) waiting to be sent, and, if a terminal from the second list is connected to at least two transmitting stations, to command transmission of the data packet waiting to be sent for that terminal from the two transmitting stations.

The invention also provides a base station adapted to transmit data packets during a transmission time slot, time being divided into time slots for time-division multiplexing transmission to a plurality of terminals, comprising a scheduling device for a transmission time slot as described above and one or more transmitting stations of a group of transmitting stations.

The invention further provides:
a program for scheduling during a transmission time slot, time being divided into time slots for time-division multiplex transmission to a plurality of terminals, for a scheduling device, the program including program code instructions adapted to command execution of the steps of the method as described above to be executed by the scheduling device when said program is executed by the scheduling device;
a storage medium readable by a scheduling device storing the program as described above.

BRIEF DESCRIPTION OF THE DRAWINGS

The invention can be better understood in the light of the following description of one particular embodiment of the invention, given with reference to the appended drawings, in which.

DETAILED DESCRIPTION OF THE INVENTION

Figure 1:
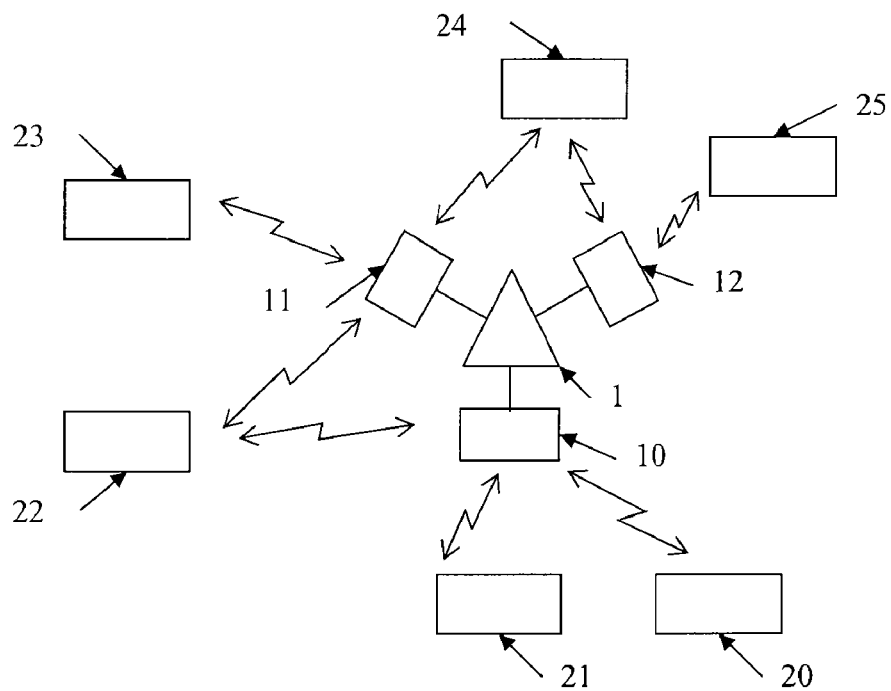
FIG. 1 represents part of a communications network.

FIG. 1 shows part of a communications network comprising a Node B or base station 1 and three transmitting stations 10, 11, and 12. This kind of configuration is commonly referred to as a tri-sectorial site. The transmitting stations 10, 11, 12 correspond to different antennas controlled by the same base station 1. FIG. 1 shows terminals 20, 21, 22, 23, 24, and 25. The terminals 20 and 21 have a communications link with the transmitting station 10, the terminal 23 with the transmitting station 11, and the terminal 25 with the transmitting station 12. The terminal 24 is in an area of overlap of the transmitting stations 11 and 12 and is connected to those two stations 11, 12 by two radio links. The terminal 22 is in an area of overlap of the transmitting stations 10 and 11 and is connected to those two stations 10, 11 by two radio links.

The terminal 24 is connected to the transmitting station corresponding to the best reference signal, i.e. the transmitting station for which the power of the reference signal received by the terminal is the highest, for example the transmitting station 12, and to the transmitting station corresponding to the second best reference signal, for example the transmitting station 11, if the power difference between the best reference signal and the second best reference signal is below a predetermined threshold, for example 3 decibels (dB), for a sufficiently long time period, of the order of one second. A particular decision process in the transmitting station enables the terminal to be connected simultaneously to more than one transmitting station. The decision to connect a terminal to one or more transmitting stations is based on measurements by the terminal averaged over a period of the order of one second of the power of the reference signal sent by each transmitting station and received by the terminal, fed back regularly to the transmitting station. All radio links used simultaneously between the network and the terminal constitute an "active set". When the terminal connected to a current transmitting station begins to move away from it and toward one or more adjacent transmitting stations, one or more radio links can be set up with one of the adjacent stations and coexist with the link with the current transmitting station. That current transmitting link is suppressed when radio conditions become too unfavorable. This kind of decision process is used in CDMA (Code Division Multiple Access) UMTS networks and is not described in more detail here. The terminal can manage up to six active radio links.

In the context of the invention, the transmitting stations use a time-shared HSDPA (High Speed Downlink Packet Access) access radio channel to transmit data packets at high speed in the downlink direction. The HS-DSCH downlink shared access channel is time-shared between mobile terminals in a given cell. Thus time is divided into time slots with a duration of the order of one millisecond for time-division multiplex transmission to a plurality of terminals.

For example, in FIG. 1, the downlink transmission radio channel of the transmitting station 10 is time-shared between the terminals 20 and 21. Transmission to the terminal 20 is effected in a given time slot and to the terminal 21 in another time slot, assuming that both have data packets waiting to be sent.

A terminal is referred to as "active" if there is one or more data packets in a transmitting station waiting to be sent to that terminal.

Figure 2:
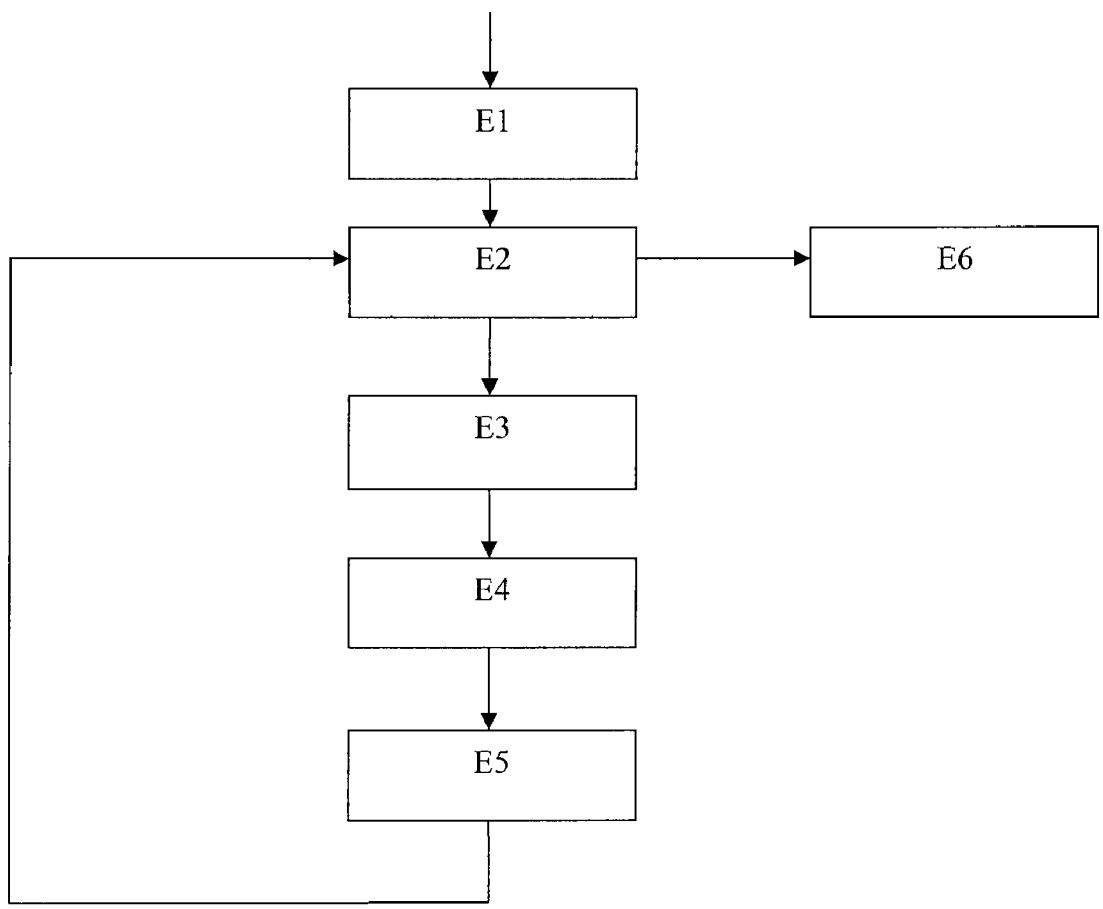
FIG. 2 represents the steps of a scheduling method according to one particular embodiment of the invention.

The scheduling method of a given transmission time slot is described below with reference to FIG. 2.

A list of terminals referred to as the "second list" is empty when scheduling is initialized.

A first step E1 establishes a first list of active terminals 20, 21, 22, 23, 24, 25 having one or more data packets waiting to be sent in one or more of the transmitting stations 10, 11, 12 of a group of transmitting stations. For example, it is considered below that the transmitting stations 10, 11, and 12 form a predetermined group of transmitting stations, that the terminals 20, 21, 22, 23, and 24 have one or more data packets waiting to be sent in one or more of the transmitting stations of the predetermined group, and that the terminal 25 has no packet waiting to be sent. The first list is therefore as follows: {20, 21, 22, 23, 24}.

The next step is a test step E2 that verifies if the first list contains one or more terminals.

If the first list is not empty, there follows a third step E3 of selecting a terminal from the first list.

In a first embodiment, the selection step E3 uses a fair scheduling algorithm, for example a Round Robin algorithm. This type of algorithm shares radio resources fairly between the terminals independently of the prevailing radio conditions. A terminal is selected from the first list and in a step E4 the selected terminal is added to the second list of terminals and removed from the first list of terminals.

In a second embodiment, the selection step E3 uses an opportunistic scheduling algorithm. An opportunistic scheduling algorithm also guarantees the terminals fair access to the shared radio channel and maximizes the transmitted data rate. An opportunity metric is calculated for each of the terminals in the first list. For example, this opportunity metric can be calculated using the Proportional Fair algorithm described in U.S. Pat. No. 6,449,490. The opportunity metric is defined for each terminal as the ratio between the estimated data rate that can be achieved over a given time slot T and the average data rate achieved up to that time slot. The estimated data rate d(i,T) that can be achieved over the given time slot T for the terminal i is calculated from radio quality measurements effected by the terminal in each time slot. The average data rate r(i,T) achieved is updated for each time slot T as follows:

$$r(i,T)=(1-a)r(i,T-1)+ae(i,T-1)$$

where a is a parameter varying between 0 and 1 and e(i,T−1) corresponds to the data rate actually achieved by the terminal i in the preceding time slot T-1.

Other opportunistic scheduling algorithms can be used. Another example of an opportunity metric is the estimated data rate that can be achieved.

The opportunity metric is calculated as a function of radio link quality measurements, in particular the channel quality indicator (CQI), effected by the terminals, for each transmission time slot, on a reference signal sent on a reference radio channel of the transmitting station to which they are connected known as the common pilot channel (CPICH). The measurements effected by the terminals are fed back to the base station 1. This measurement of radio link quality is representative of the signal-to-interference ratio on the radio link to the transmitting station. It is converted into an estimated data rate that can be achieved.

Where a terminal is connected to two or more transmitting stations, depending on the capabilities of that terminal, one or more radio quality measurements can be used to calculate the opportunity metric. In a first variant, the best measurement of radio link quality fed back by the terminal is used. In a second variant, the radio quality measurements effected by the terminal for the plurality of transmitting stations are combined.

In the second variant a terminal is selected from the first list having the best opportunity metric and in a step E4 the selected terminal is added to the second list of terminals and removed from the first list of terminals.

In the present example, it is assumed that the terminal 24 is the terminal selected in the step E3. Following the step E4, the second list therefore comprises the terminal 24: {24}.

Following the steps E4 and E5, the transmitting station or each transmitting station to which the selected terminal is connected is determined. In the present example, this means the transmitting stations 11 and 12.

If the first list contains one or more other terminals also connected to the transmitting station determined in the step E5 or, if more than one such transmitting station is determined, to one or more of those transmitting stations, that other terminal is removed from the first list.

In the present example, the terminals connected to one or both of the transmitting stations 11 and 12 are therefore removed from the first list, namely the terminals 23 and 22. The first list is then as follows: {20, 21}.

Following the step E5, the process returns to the step E2.

In the present example, assuming that the terminal 21 is the terminal selected in the step E3, following the second iteration of the steps E2 to E5, the first list is empty and the second list comprises the terminals 24 and 21.

If the result of the test in the step E2 shows that the first list of terminals is empty, there follows a step E6 of commanding transmission during the given time slot of the data packet(s) waiting to be sent to the terminal(s) in the second list. The step E6 commands transmission of the data packet(s) waiting to be sent to the terminal(s) in the second list. If a terminal in the second list is connected to two or more transmitting stations, transmission of the data packet waiting to be sent from the two transmitting stations is commanded for the given time slot.

In the present example, the transmitting station 10 is commanded to transmit the data packet waiting to be sent to the terminal 21, which is included in the second list, during the given transmission time slot. Because the terminal 24 is also in this second list and connected to two transmitting stations, the transmitting stations 11 and 12 are commanded to transmit the same data packet to the terminal 24.

The process is then repeated for the next transmission time slot.

Figure 3:
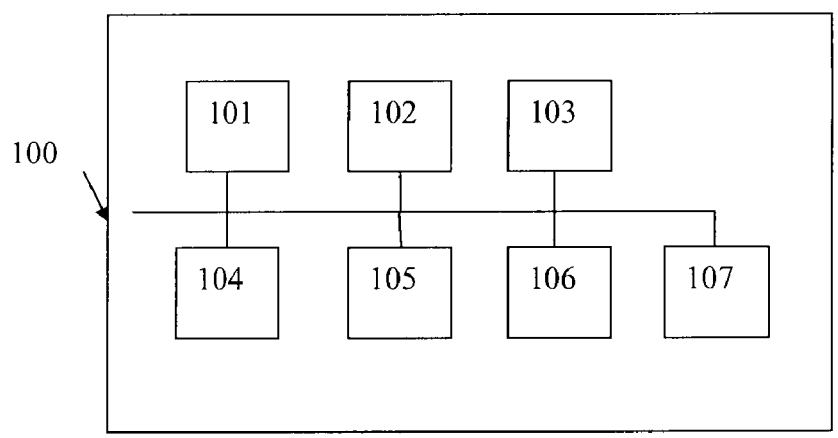
FIG. 3 represents a scheduling device of the invention.

A scheduling device 100 for a transmission time slot is described below with reference to FIG. 3.

The scheduling device 100 comprises:
- means 101 for establishing a first list of active terminals, adapted to establish a list of terminals having one or more data packets waiting to be sent and connected to one or more of the transmitting stations of the group of transmitting stations;
- test means 102 adapted to verify if the first list contains one or more terminals;
- means 103 for selecting a terminal from the first list;
- means 104 for adding the selected terminal to a second list, adapted to add the selected terminal to a second list;
- means 105 for determining connection transmitting stations, adapted to determine the transmitting station(s) to which the selected terminal is connected;
- means 106 adapted to remove from the first list terminals connected to the transmitting station or one or more of the transmitting stations determined by the determination means 105;
- means 107 for commanding transmission during the given time slot, adapted to command transmission to the terminal(s) in the second list the respective data packet(s) waiting to be sent, and, if a terminal from the second list is connected to at least two transmitting stations, to command transmission of the data packet waiting to be sent for that terminal from the two transmitting stations.

The device 100 commands transmission by the transmitting stations 10, 11, 12 that are connected to it via control means 107.

A base station 1 conforming to version R5 of the UMTS standard and supporting HSDPA can comprise the scheduling device 100 described above and one or more transmitting stations controlled by the device.

The modules 101, 102, 103, 104, 105, 106, 107 that implement the method described above are preferably software modules comprising software instructions for execution of the steps of the method described above by the device 100. The software modules can be stored in or transmitted by a data medium. This medium can be a hardware storage medium, for example a CD-ROM, a magnetic diskette or a hard disk, or a transmission medium such as an electrical, optical or radio signal, or a telecommunications network.

The description of the invention is based on a communications network conforming to version R5 of the UMTS standard and supporting HSDPA. The invention is equally applicable to any type of network implementing a radio link to which access is shared by a plurality of terminals, for example the CDMA 2000 1XEVDO standard supporting HDR (high data rate) channels.

The invention claimed is:

1. A method of scheduling for a given transmission time slot, time being divided into time slots for time division multiplex transmission to a plurality of terminals, said method comprising:
   a. establishing a first list of active terminals having one or more data packets waiting to be sent, said terminals being connected to one or more transmitting stations of a group of transmitting stations;
   b. determining whether the first list contains one or more terminals;
   c. if the first list contains one or more terminals, selecting a terminal from the first list;
   d. adding the selected terminal to a second list;
   e. determining two or more transmitting stations to which the selected terminal is connected;
   f. if the first list contains one or more other terminals also connected to the transmitting stations determined in e, deleting said other terminal(s) from the first list;
   g. repeating b to f until the first list is empty;
   h. when the first list is empty, commanding transmission during the given time slot, to the terminal or terminals from the second list, the respective data packet or packets waiting to be sent; and
   i. if a terminal from the second list is connected to at least two transmitting stations, commanding transmission of the data packet waiting to be sent for this terminal from the at least two transmitting stations.

2. A method according to claim 1, wherein selecting the terminal from the first list is effected as a function of radio link quality measurements effected by the terminals in the first list on a reference radio signal from one or more transmitting stations to which they are connected.

3. A method according to claim 2, wherein selecting the terminal from the first list is effected using an opportunistic scheduling algorithm.

4. A method according to claim 1, wherein the transmitting stations of the group correspond to different antennas of the same base station.

5. An apparatus for scheduling a transmission time slot, time being divided into time slots for time-division multiplex transmission to a plurality of terminals, said apparatus comprising:
   a processor; and
   a memory storing instructions that, when executed, cause the processor to at least:
      establish a first list of active terminals having one or more data packets waiting to be sent and connected to one or more transmitting stations of a group of transmitting stations;
      determine whether the first list contains one or more terminals;
      select a terminal from the first list;
      add the selected terminal to a second list;
      identify two or more transmitting stations to which the selected terminal is connected;
      remove from the first list terminals connected to the identified transmitting stations;
      command transmission during the given time slot to the terminal(s) in the second list the respective data packet(s) waiting to be sent;
      if a terminal from the at least second list is connected to at least two transmitting stations, command transmission of the data packet waiting to be sent for that terminal from the two transmitting stations.

6. A base station to transmit data packets during a transmission time slot, time being divided into time slots for time-division multiplex to a plurality of terminals, comprising a scheduling device for a transmission time slot according to claim 5.

7. A non-transitory computer-readable storage medium storing instructions that, when executed, cause a machine to schedule during a transmission time slot, time being divided into time slots for time-division multiplex transmission to a plurality of terminals, by carrying out at least the method according to claim 1.

8. A method according to claim 1, further comprising:
   j. if the selected terminal is connected to only one transmitting station and if the first list contains one or more other terminals also connected to the one transmitting station determined, deleting said other terminal(s) from the first list; and
   k. repeating b to f and j until the first list is empty.

* * * * *